United States Patent [19]

Brandt

[11] Patent Number: 4,613,927
[45] Date of Patent: Sep. 23, 1986

[54] ELEVATED SIGNAL INDICATOR FOR A MOTOR VEHICLE

[76] Inventor: Wilbur Brandt, 207 University Blvd., West, Silver Spring, Md. 20901

[21] Appl. No.: 748,179

[22] Filed: Jun. 24, 1985

[51] Int. Cl.$^4$ .............................................. F21V 8/00
[52] U.S. Cl. ...................................... 362/32; 362/80; 340/87; 446/238
[58] Field of Search ...................... 362/32, 61, 80, 227, 362/236, 257; 340/67, 74, 84, 87; 446/438

[56] References Cited

U.S. PATENT DOCUMENTS

| | | | |
|---|---|---|---|
| 3,432,808 | 3/1969 | Fleece | 340/87 X |
| 3,905,017 | 9/1975 | Samra | 362/80 X |
| 3,913,872 | 10/1975 | Weber | 362/32 |
| 4,430,692 | 2/1984 | Papadakis | 362/32 |
| 4,500,167 | 2/1985 | Mori | 362/32 X |
| 4,559,022 | 12/1985 | Herstein et al. | 446/438 |

Primary Examiner—Willis R. Wolfe, Jr.

[57] ABSTRACT

A signal indicator for an automobile in the form of a reduced-size model of an automobile is mounted behind the rear window of the automobile. Light bulbs inside the signal indicator are activated by the turn signals, brakes, backup signals, tail lights and emergency flashers of the automobile.

2 Claims, 5 Drawing Figures

ELEVATED SIGNAL INDICATOR FOR A MOTOR VEHICLE

BACKGROUND OF THE INVENTION

Field of the Invention

Elevated backup lights, brake lights and turn signal lights on automobiles enhance visibility and increase driving safety on highways.

SUMMARY OF THE INVENTION

This invention provides a model of an automobile mounted on the rear deck inside the rear window of an automobile with lights in the model in positions analogous to those of corresponding lights on the automobile itself. It is an object of this invention to provide a signal indicator which is highly visible to the driver of an automobile behind the vehicle displaying the signal indicator.

DETAILED DESCRIPTION

Figure 1:
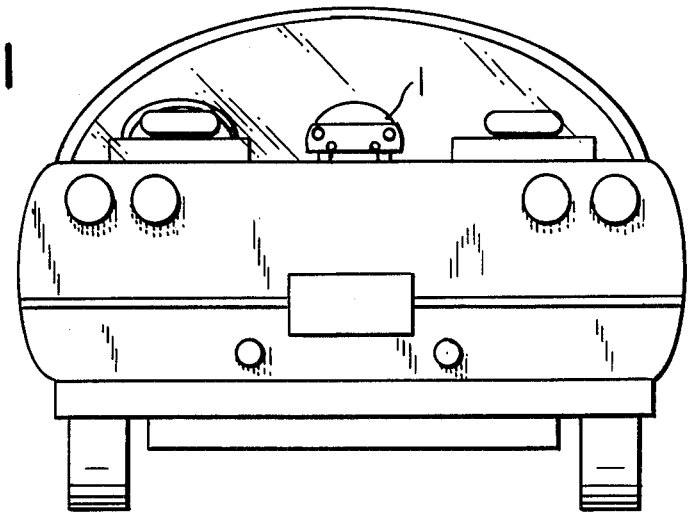
FIG. 1 is a rear elevational view of a motor vehicle with an elevated signal indicator shown in accordance with the present invention.
Figure 2:
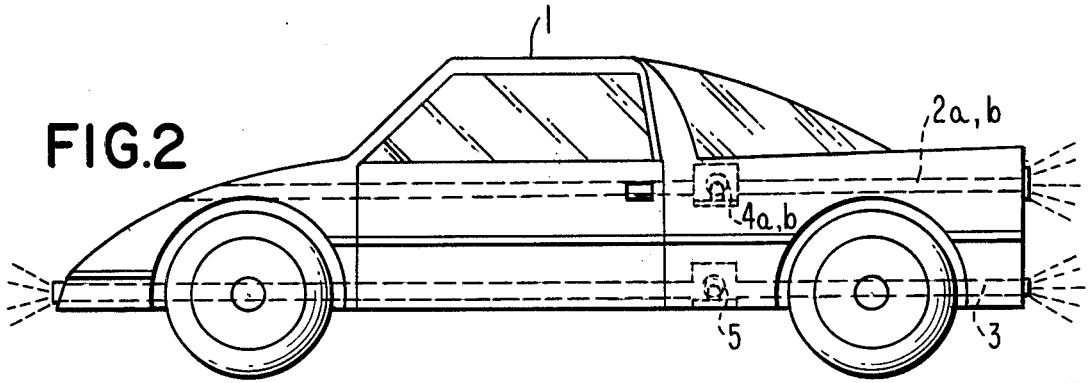
FIG. 2 is a side elevational view of the invention.

As illustrated by FIG. 1, a model of a motor vehicle 1 is mounted on the rear deck inside the rear window of a motor vehicle, said model being a signal indicator. As furthermore illustrated by FIG. 2, a side elevational view of the signal indicator in accordance with this invention, light bulbs 4a, 4b and 5 are disposed inside the signal indicator as well as light tubes 2a, 2b and 3 which convey the light from the light bulbs to the front and the rear of the signal indicator.

Figure 3:
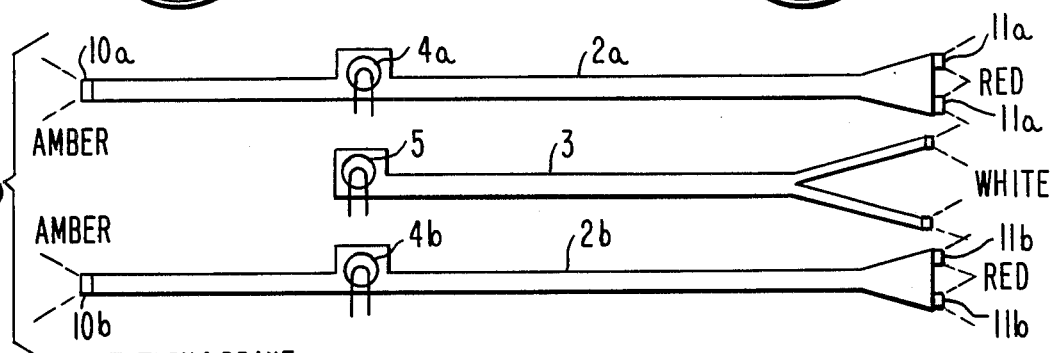
FIG. 3 is a diagrammatic view of the light transmitting means.

FIG. 3 shows schematically in plan view the manner in which light is transmitted from the light bulbs 4a and 4b through light tubes 2a and 2b to the front and rear of the signal indicator. Transparent amber lenses 10a and 10b are provided at the front of the light tubes, and transparent red lenses 11a and 11b are provided at the back end of the light tubes. Also illustrated in FIG. 3 is the manner in which light from the light bulb 5 signalling the driver's intention to back up, is transmitted to the rear of the signal indicator via light tube 3.

Figure 4:
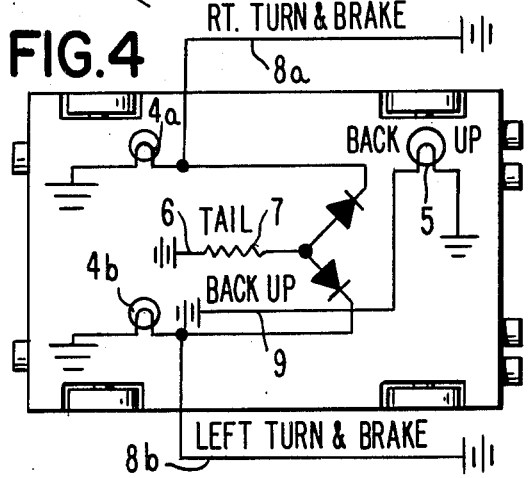
FIG. 4 is a bottom view of the vehicle and circuit diagram.
Figure 5:
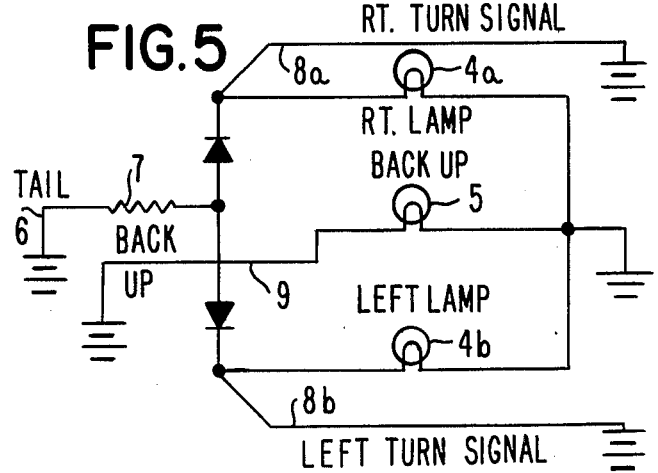
FIG. 5 is a circuit diagram of the embodiment of the invention.

The wiring diagram of the invention is shown in FIGS. 4 and 5. When the tail lights are turned on, wire 6 is connected to the 12 volt wire from the automobile's battery. Current flows through resistor 7 and dimly illuminates light bulbs 4a and 4b.

When the right turn signal is turned on, wire 8a is intermittently connected to the 12 volt wire from the battery through the vehicle's flasher unit. Lamp 4a intermittently glows brightly.

Lamp 4b similarly responds to the use of the left signal indicator.

When the gear shift lever of the vehicle is put into reverse, wire 9 is connected to the 12 volt battery wire and lamp 5 lights up, simulating the vehicle's backup lights.

When the brake pedal of the vehicle is pushed, both wires 8a and 8b are connected to the 12 volt battery wire and both lamps 4a and 4b light up brightly. When the emergency flasher of the vehicle is activated, both wires 8a and 8b intermittently are connected to the 12 volt battery wire, and lamps 4a and 4b intermittently light up brightly.

While various changes may be made in the detail construction, it is understood that such changes will be within the spirit and scope of the present invention, as is defined by the appended claims.

What I now claim is:

1. An elevated signal indicator for a motor vehicle, comprising, in combination, a reduced-size model of an automobile for being mounted on a rear deck inside a rear window of said motor vehicle; said model having a plurality of lights each of which shines in a location analogous to a position of corresponding lights on said motor vehicle; said lights comprising a brake and backup signal light, a left turn signal light and a right turn signal light, and each one of said signal lights of said model comprising an electric lamp bulb within an interior of an elongated light tube extending between a front and rear ends of said model for directing light rays forwardly and rearwardly therefrom, an amber lens across a front end of said tube and a red lens across a rear end thereof; and each said lamp bulb of said model being in an electrical circuit with corresponding of said lights of said motor vehicle.

2. The combination as set forth in claim 1, wherein said lights in said elevated signal indicator are activated when said motor vehicle's tail lights and emergency flashers are turned on.

* * * * *